(12) United States Patent
Koenig et al.

(10) Patent No.: US 10,371,237 B2
(45) Date of Patent: Aug. 6, 2019

(54) BELT WAVE DRIVES

(71) Applicant: SRI International, Menlo Park, CA (US)

(72) Inventors: Karen Shakespear Koenig, San Francisco, CA (US); Pablo Eduardo Garcia Kilroy, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 102 days.

(21) Appl. No.: 15/588,293

(22) Filed: May 5, 2017

(65) Prior Publication Data

US 2017/0241521 A1    Aug. 24, 2017

Related U.S. Application Data

(63) Continuation of application No. 14/746,708, filed on Jun. 22, 2015, now Pat. No. 9,644,716.

(Continued)

(51) Int. Cl.
*F16H 7/02* (2006.01)
*F16H 9/26* (2006.01)
(Continued)

(52) U.S. Cl.
CPC ............... *F16H 9/26* (2013.01); *F16H 7/02* (2013.01); *F16H 55/38* (2013.01); *F16H 55/54* (2013.01); *F16H 57/08* (2013.01)

(58) Field of Classification Search
CPC ..... F16H 9/26; F16H 7/06; F16H 1/32; F16H 2025/066; H02N 13/00
(Continued)

(56) References Cited

U.S. PATENT DOCUMENTS 499,694 A * 6/1893 Wright ............... F16H 9/26
475/182
541,713 A * 6/1895 Bolton ............... F16H 7/06
474/139
(Continued)

FOREIGN PATENT DOCUMENTS

| GB | 112612 A | 2/1918 |
| JP | 58-189850 U | 12/1983 |
| JP | H08146783 A | 6/1996 |

OTHER PUBLICATIONS

International Search Report and Written Opinion of International Application No. PCT/US2015/037028, dated Mar. 18, 2016.
(Continued)

*Primary Examiner* — Henry Y Liu
(74) *Attorney, Agent, or Firm* — McDonnell Boehnen Hulbert & Berghoff LLP

(57) ABSTRACT

A belt wave drive transmission system and method are shown involving a first rotor (10) having a first drum configured to rotate about its axis of rotation and a second rotor (20) having a second drum configured to rotate about its axis of rotation, where the first rotor (10) is constrained to orbit concentrically about the axis of rotation of the second drum. A belt (30) encircles the first and second drums to couple the first (10) and second (20) rotors such that the first rotor (10) moves concentrically around the second rotor (20) as the belt (30) advances about a circumference of the second drum. In further refinements, the system and method involve electrically controllably coupling at least one of the first and second rotors to the belt.

20 Claims, 13 Drawing Sheets

Related U.S. Application Data

(60) Provisional application No. 62/015,993, filed on Jun. 23, 2014.

(51) Int. Cl.
*F16H 55/38* (2006.01)
*F16H 55/54* (2006.01)
*F16H 57/08* (2006.01)

(58) Field of Classification Search
USPC .......................................................... 474/139
See application file for complete search history.

(56) References Cited

U.S. PATENT DOCUMENTS

| | | | | |
|---|---|---|---|---|
| 550,474 A * | 11/1895 | Bolton | ...................... | F16H 7/06 474/139 |
| 573,230 A * | 12/1896 | Monkiewicz | ............ | B62M 9/04 474/139 |
| 618,190 A * | 1/1899 | Sturgess | .................. | F16H 48/12 74/650 |
| 1,423,028 A * | 7/1922 | Roth | .......................... | F16H 7/06 474/139 |
| 1,651,756 A * | 12/1927 | Ehmsen | .................. | F16H 55/38 474/142 |
| 1,670,144 A * | 5/1928 | Ewart | ........................ | F16H 9/26 475/182 |
| 1,877,338 A * | 9/1932 | Kottlowski | ............... | F16H 7/06 464/49 |
| 2,210,240 A * | 8/1940 | Herrick | .................... | F16H 3/72 475/1 |
| 2,326,235 A * | 8/1943 | Lienhard | ................. | B62M 3/04 475/182 |
| 2,559,299 A * | 7/1951 | Helling | ..................... | F16H 7/00 475/182 |
| 2,568,824 A * | 9/1951 | Rahbek | ..................... | F16H 7/02 188/158 |
| 2,852,954 A * | 9/1958 | Hobbs | ...................... | F16H 35/02 475/14 |
| 2,941,421 A * | 6/1960 | Plotti | ....................... | F16D 67/00 474/14 |
| 3,148,560 A * | 9/1964 | Woodward, Jr. | .......... | F16H 9/26 475/182 |
| 3,691,871 A * | 9/1972 | Gladow | .................... | F16H 7/00 33/832 |
| 3,893,532 A * | 7/1975 | Perlowin | .............. | B60L 3/0061 180/19.1 |
| 3,986,442 A * | 10/1976 | Khoja | .................. | B04B 5/0442 475/182 |
| 4,023,440 A * | 5/1977 | Kennington | .............. | F16H 1/32 475/159 |
| 4,099,427 A * | 7/1978 | Fickelscher | ............... | F16H 1/32 475/176 |
| 4,223,757 A * | 9/1980 | Olander | ................. | B60K 23/00 180/273 |
| 4,471,672 A * | 9/1984 | Butterfield | .............. | F16H 25/06 188/82.84 |
| 4,567,790 A * | 2/1986 | Butterfield | .............. | F16H 25/06 475/168 |
| 4,583,962 A * | 4/1986 | Bytzek | .................. | F16H 7/1218 474/133 |
| 4,729,756 A * | 3/1988 | Zimmer | .................. | F16G 13/06 474/214 |
| 4,807,494 A * | 2/1989 | Lew | .......................... | F16H 1/32 475/166 |
| 4,841,810 A * | 6/1989 | Lew | .......................... | F16H 1/32 475/165 |
| 5,103,367 A * | 4/1992 | Horwitz | ............... | H01L 21/6831 269/8 |
| 5,286,237 A * | 2/1994 | Minegishi | ................. | F16H 1/32 475/178 |
| 5,325,261 A * | 6/1994 | Horwitz | ................. | H02N 13/00 361/230 |
| 5,445,572 A * | 8/1995 | Parker | ...................... | A61G 5/04 475/182 |
| 5,462,363 A * | 10/1995 | Brinkman | ................. | F16H 7/00 29/898.04 |
| 5,569,967 A * | 10/1996 | Rode | ..................... | H02K 1/2733 310/103 |
| 5,856,710 A * | 1/1999 | Baughman | ............ | B60R 16/027 280/735 |
| 5,954,611 A * | 9/1999 | Mills | ......................... | F16H 9/26 475/182 |
| 5,970,822 A * | 10/1999 | Jung | ....................... | B62M 1/00 280/236 |
| 6,922,324 B1* | 7/2005 | Horwitz | .............. | H01L 21/6831 279/128 |
| 7,551,419 B2* | 6/2009 | Pelrine | .................. | H02N 13/00 361/234 |
| 7,554,787 B2* | 6/2009 | Pelrine | .................. | B62D 57/00 361/234 |
| 7,592,727 B1* | 9/2009 | Doughty | .............. | H02K 49/046 310/105 |
| 7,773,363 B2 | 8/2010 | Pelrine et al. | | |
| 8,425,363 B2* | 4/2013 | Kim | ........................ | B25J 9/103 475/182 |
| 8,852,048 B2* | 10/2014 | Shelef | .................. | F16H 49/001 475/331 |
| 9,644,716 B2 | 5/2017 | Koenig et al. | | |
| 2003/0121363 A1* | 7/2003 | Poehlau | .................. | F16H 25/20 74/640 |
| 2008/0161142 A1* | 7/2008 | Shiozaki | ................ | F02B 61/02 474/70 |
| 2008/0254929 A1* | 10/2008 | Wesling | ................... | B62M 9/16 475/182 |
| 2009/0026864 A1* | 1/2009 | Ichiyama | ............. | H02K 21/028 310/154.28 |
| 2012/0046140 A1* | 2/2012 | Shelef | .................. | F16H 49/001 475/182 |
| 2013/0010398 A1* | 1/2013 | Prahlad | ................. | H02N 13/00 361/234 |
| 2013/0023373 A1* | 1/2013 | Janek | ........................ | F16H 1/32 475/162 |
| 2014/0035306 A1* | 2/2014 | Garcia | ................. | B25J 15/0009 294/213 |
| 2015/0176443 A1* | 6/2015 | Frank | ...................... | F01L 1/352 474/111 |
| 2015/0277338 A1* | 10/2015 | Hamada | ............... | G03G 15/757 399/167 |
| 2015/0369344 A1* | 12/2015 | Koenig | ..................... | F16H 7/02 475/149 |
| 2016/0297500 A1* | 10/2016 | Dubose | .................... | B62M 6/55 |

OTHER PUBLICATIONS

Eric Stackpole, "Magnetically Coupled Drive," OpenROV Forums, Jun. 2011, https://forum.openrov.com/t/magnetically-coupled-drive/30.

* cited by examiner

Back view (in the direction of arrow 160)

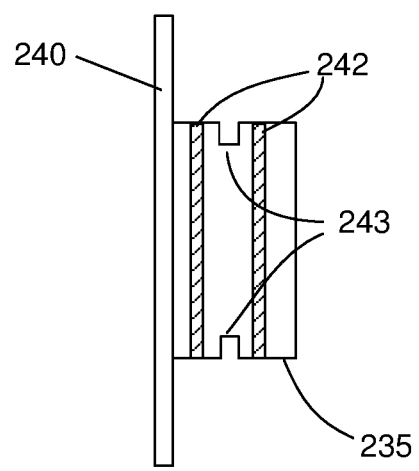
Fig. 3B (Simplified Side view of 240)

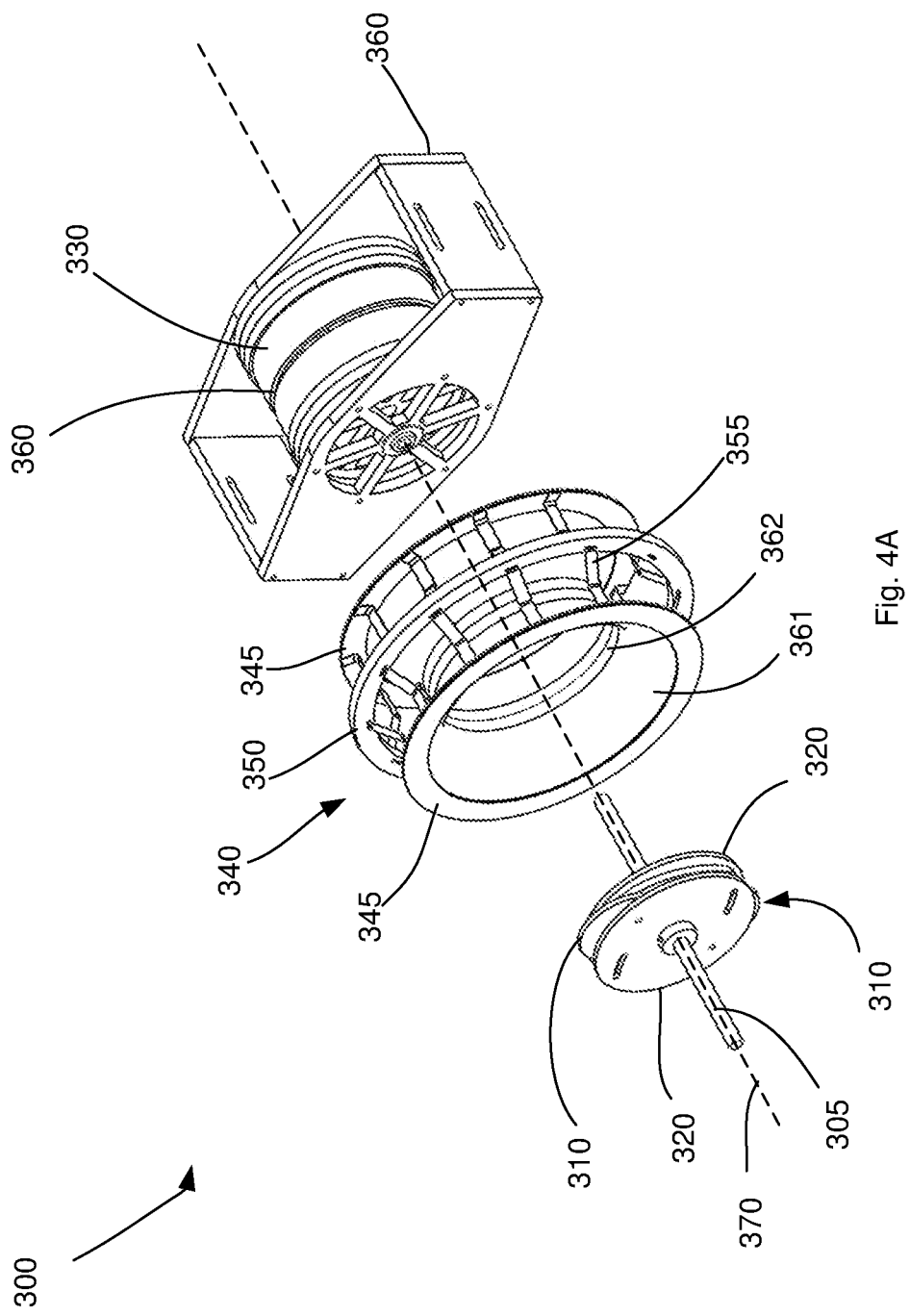

BELT WAVE DRIVES

CROSS REFERENCE TO RELATED APPLICATIONS

This application is a continuation of U.S. patent application Ser. No. 14/746,708 for "Belt Wave Drives" filed Jun. 22, 2015, which claims the benefit of U.S. Provisional Patent Appl. No. 62/015,993 for "Belt Wave Drives" filed Jun. 23, 2014. The foregoing applications are incorporated herein by reference in their entirety for all purposes.

GOVERNMENT LICENSE RIGHTS

This invention was made with government support under Contract No. W91CRB-10-C-0139 awarded by the United States Army. The government has certain rights in this invention.

BACKGROUND

The use of drives and transmissions in mechanical and electromechanical systems is quite common for such applications as motion control, electronics, machine tools, printing machines, robotics and aerospace. In many situations involving actuators and electromechanical systems, a high gear reduction ratio is useful.

Typically, high gear reduction ratios are achieved by having multiple gear stages. In applications where size and weight is of less concern, having multiple gear stages is an appropriate method to achieve high gear reduction ratios. However, in many applications, size and weight are of great concern.

Further, in some applications, such as robotics or actuators, joints that permit the device to move typically have a fixed reduction ratio transmission system, which may not provide an efficient force/speed ratio for the wide range of operating conditions of the device. This type of design, where a fixed ratio transmission system is provided, often leads to inefficient use of energy sources, which is a particular issue in applications that rely on battery power, such as mobile applications. These inefficiencies limit the practical use of such devices in many applications. Improving the efficiency of energy conversion generally leads to longer operation time for a given a battery source. Greater efficiency may also permit smaller motors to be utilized, which may enable more compact designs to be utilize for both mobile and stationary mounted applications.

Another problem for electromechanical actuator systems is that they are often designed for worst case load or speed conditions, making them big and bulky. Designing a device that can quickly adapt to changing load conditions and operate with high efficiency would also be desirable.

Transmission systems with large gear reduction ratios in a single stage are available commercially. An example of a commercially available device that provides a high gear reduction ratio in a single stage is a harmonic drive. A basic harmonic drive includes a fixed circular spline with teeth formed on its inside surface, a flex spline made of flexible material with teeth formed on its outside surface that engage with the teeth of the circular spine, and an elliptical wave generator that is tightly fit within the flex spline. The flex spline has fewer teeth than the circular spline. When the wave generator is rotated by an input shaft, it deforms the flex spline, which is connected to an output shaft, into an elliptical shape that causes the teeth of the flex spine to engage the teeth of the circular spline. Because the flex spline has fewer teeth than the circular spline, the rotation causes different teeth of the flex spline to engage the circular spline resulting in a slight backward rotation of the flex spline with respect to the circular spline. The teeth of the circular and flex splines typically feature fine gearing that requires the use of high-precision machined parts, which makes them expensive. Because harmonic drives also rely on the flexing of component materials, they often experience high rates of wear and may result in the use of heavier and larger parts to compensate for wear or require frequent replacement of worn out drives. As a result, harmonic drives are often relatively large, heavy and expensive to operate.

In many applications, there is also a need to monitor and sense how hard the actuator may be pushing against a load. Typical solutions for monitoring include adding some type of force sensor, which adds to the cost and complexity of the device. It may be advantageous to use the actuator itself in a back-drivable mode to act as a sensor such that the current through the actuator monitored and may be related to the force applied by the actuator. However, for a drive system to be back-drivable, it needs to be efficient without significant friction losses encountered when driven backwards. Typical on-market systems do not have the desired characteristics to utilize the actuator as a sensor.

Thus there is a need for single stage, efficient, lightweight, compact, low-cost drive systems that achieve high gear ratio reduction.

SUMMARY

According to one aspect of the present invention, an example of a transmission system includes a first rotor with a first drum configured to rotate about its axis of rotation and a second rotor with a second drum configured to rotate about its axis of rotation, where the first rotor is constrained to orbit concentrically about the axis of rotation of the second drum. A belt encircles and couples the first and second drums such that as the first rotor moves concentrically around the second rotor, the belt advances about a circumference of the second drum.

In some embodiments, the belt and an outer surface of the second drum (135) are configured to be electrically coupled. In some embodiments, the belt and an outer surface of the second drum are configured to be electrically coupled through an electrolaminate effect between the belt and the outer surface of the second drum. In some embodiments, the belt and an outer surface of the second drum are configured such that the belt wave drive is engaged by applying a voltage signal to at least one of the belt and the second drum to produce traction and disengaged by withdrawing the voltage signal from at least one of the belt and the second drum to reduce traction between the belt and the second drum. Some embodiments include control circuitry electrically coupled to at least one of the belt and an outer surface of the second drum to which an electrostatic adhesion voltage may be applied.

In some embodiments, the belt includes one or more pairs of adjacent electrodes electrically coupled to the control circuitry and, for each pair, the control circuitry applies one polarity of the electrostatic adhesion voltage to one of the electrodes and the other polarity of the electrostatic adhesion voltage to the other electrode and the outer surface of the second drum includes a dielectric material. In other embodiments, the second drum includes one or more pairs of adjacent electrodes electrically coupled to the control circuitry and, for each pair, the control circuitry applies one polarity of the electrostatic adhesion voltage to one electrode and the other polarity of the electrostatic adhesion voltage to the other electrode and a surface of the belt includes a dielectric material.

BRIEF DESCRIPTION OF THE DRAWINGS

Various embodiments in accordance with the present disclosure will be described with reference to the drawings, in which:

FIG. 3B is a cross-sectional side view of the outer plate and drum shown in FIG. 3A;

FIG. 4A is an exploded schematic diagram illustrating an example of a belt wave drive system with a catenoid-like belt support structure in accordance with certain aspects of the present invention;

Note that the same numbers are used throughout the disclosure and Figures to reference like components and features.

DETAILED DESCRIPTION

Figure 1:
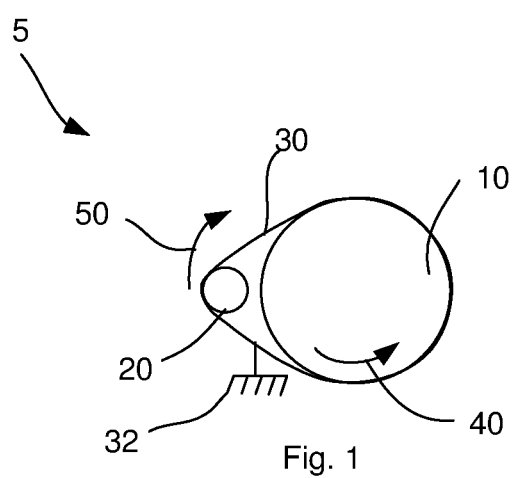
FIG. 1 is a functional diagram depicting a simplified example of a belt wave drive system in accordance with certain aspects of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Examples of a high gear reduction system are based on a belt encircling an input rotor and an output rotor. The examples described herein use belts rather than geared mechanisms to achieve high gear reduction in a single stage system that does not require precision machining of gear teeth, experiences lower wear rates, and is inexpensive to manufacture compared to conventional high gear ratio solutions, such as harmonic drives.

The achievement of a large gear ratio reduction depends largely on the configuration and length of the belt, the input rotor and the output rotor. The input and output rotor may be mechanically supported in many ways that are similar to existing rotary devices. Supporting the belt merits more careful consideration due to its impact on performance. Thus, some examples described herein illustrate ways of supporting the belt. The belt support structure in these devices has the characteristic of holding the belt to a rigid structure, such as a mechanical ground, but still permitting limited range of localized movement.

Examples of support structures are described in detail herein. As is also described, the belt and the belt support structures may be made of various lightweight materials such as elastic sheets, strings in the form of braids, carbon fiber, thin metal sheets, etc.

In the examples described below, the gear ratio reduction depends on the difference in the belt length and the output rotor circumference. These differences are very small, typically on the order of millimeters, to achieve the desired large ratio reduction. However, in other examples, the effective drum diameter with respect to the belt may be varied during operation to achieve continuous gear ratio variation. This may be advantageous in many situations, where there may be a need to quickly adapt to changing load conditions.

In some situations, as stated above, it may be advantageous to back-drive the motor. As also stated above, back-driving a motor is typically not easy in conventional commercially available systems due to the friction encountered in the various gear stages. The structure of some of the examples described in this disclosure may allow them to be back-driven.

In some examples of the proposed belt drives, gear reduction may be achieved via a single stage instead of multiple stages. This may have implications to the size and weight of the overall system utilizing a belt wave drive as described herein in that the size and weight may both be reduced. In robots, for instance, reducing the size and weight is advantageous so that the performance of the robot may be enhanced.

Other benefits may derive from the fact that lightweight materials can be used in the construction of some examples, as discussed above. In other examples, the devices may not require the use of complicated manufacturing techniques, such as precision machining techniques, as is generally the case with industrial harmonic wave drives. This may reduce the cost and complexity of the platforms, such as a robot, that may use some of the examples described in this disclosure.

Although a robot is described as one example of a platform where the methods and devices described in this disclosure may be utilized, some examples of the belt wave drive examples described herein may be applied to other uses and platforms. Some implementations may be useful in other types of machinery, robotic or non-robotic, where, for example, space may be a constraint, where high efficiency may be needed, or where cost and complexity need to be reduced.

As noted above, many existing systems, such as robots, typically use joints that have fixed reduction ratio transmission system that may not provide an optimum force/speed ratio for the wide range of operating conditions of the robot. Some of the examples described herein may overcome this limitation. Further, with respect to drives and transmission systems, conventional systems often use multiple gear stages to achieve high gear reduction ratio. Moreover, the conventional devices that use single stage techniques to achieve high gear ratio reduction typically need precision manufacturing techniques. Certain examples of the belt wave drives described herein may overcome some of these limitations.

Belt Wave Drives

Some of the examples described within this disclosure have the potential of creating transmissions that may be inexpensive and light weight and yet have the advantage of the large gear reduction ratio typically offered by traditional harmonic drives. To distinguish the drives described herein from traditional harmonic drives, the drives described below are referred to as belt wave drives.

FIG. 1 is a simplified functional diagram that illustrates the basic operation of a belt wave drive 5. FIG. 1 shows two drums 10 and 20 coupled together by a belt 30. Drum 10 forms the output and is free to rotate about its axis of rotation. Drum 20 forms the input or the input rotor of the device and is constrained to orbit concentrically about the axis of rotation of drum 10. Drum 20 is also free to rotate about its own axis (similar to an idler pulley). Only one orbiting drum or input rotor 20 is shown; however, there may be two or more such drums or rotors arranged about the output drum. The Figure also shows the belt 30 connected to mechanical ground 32. The specific nature of this attachment of the belt to mechanical ground will be discussed in the following sections. If the input drum or rotor 20 is rotated by an external force to move in the direction of the arrow 50, the drum 10 may move in the direction of arrow 40. The gear reduction ratio is given by Eqn. 1 below:

$$\frac{\text{Input}}{\text{Output}} = \frac{\text{Output Belt Length}}{[(\text{Output Belt Length}) - (\text{Drum Circumference})]} \quad (1)$$

The attachment of the belt 30 to the drum 10 determines the maximum output torque that can be transmitted. Various means may be utilized to increase the effective coupling between the belt 30 and the drum 10. One way, for example, is to utilize an electrically controllable coupling technique, such as electroadhesive or electrolaminate effect, to tightly couple the belt with the drum. (Various additional details and embodiments regarding electroadhesion and applications thereof can be found at, for example, commonly owned U.S. Pat. Nos. 7,551,419; 7,554,787; and 7,773,363 and U.S. Published Application No. 20130010398, which are incorporated by reference herein in their entirety and for all purposes.) The inside surface of the belt and the outside surface of the drum 10 (specifically the side surfaces of the drum) may form the two electrolaminate surfaces. This arrangement provides for the belt 30 to be controllably and reversibly coupled to the drum 10. In some examples, the electrically controllable coupling technique may be partially combined with other ways to increase the coupling between the belt and drum, such as the use of materials which have a high coefficient of friction, high belt tension, toothed belts and drums, timing belts and pulleys, perforated belts combined with a drum containing mating features, or finely textured surfaces which interlock on a microscopic scale. Electrically controllable coupling techniques are described further below.

As the belt length is only slightly larger than the drum circumference, the output speed may be a small fraction of the input speed, thus achieving a high gear reduction ratio. The output torque is increased by the same ratio. The negative sign indicates that the output is moving in the opposite direction of the input.

Figures 2A, 2B:
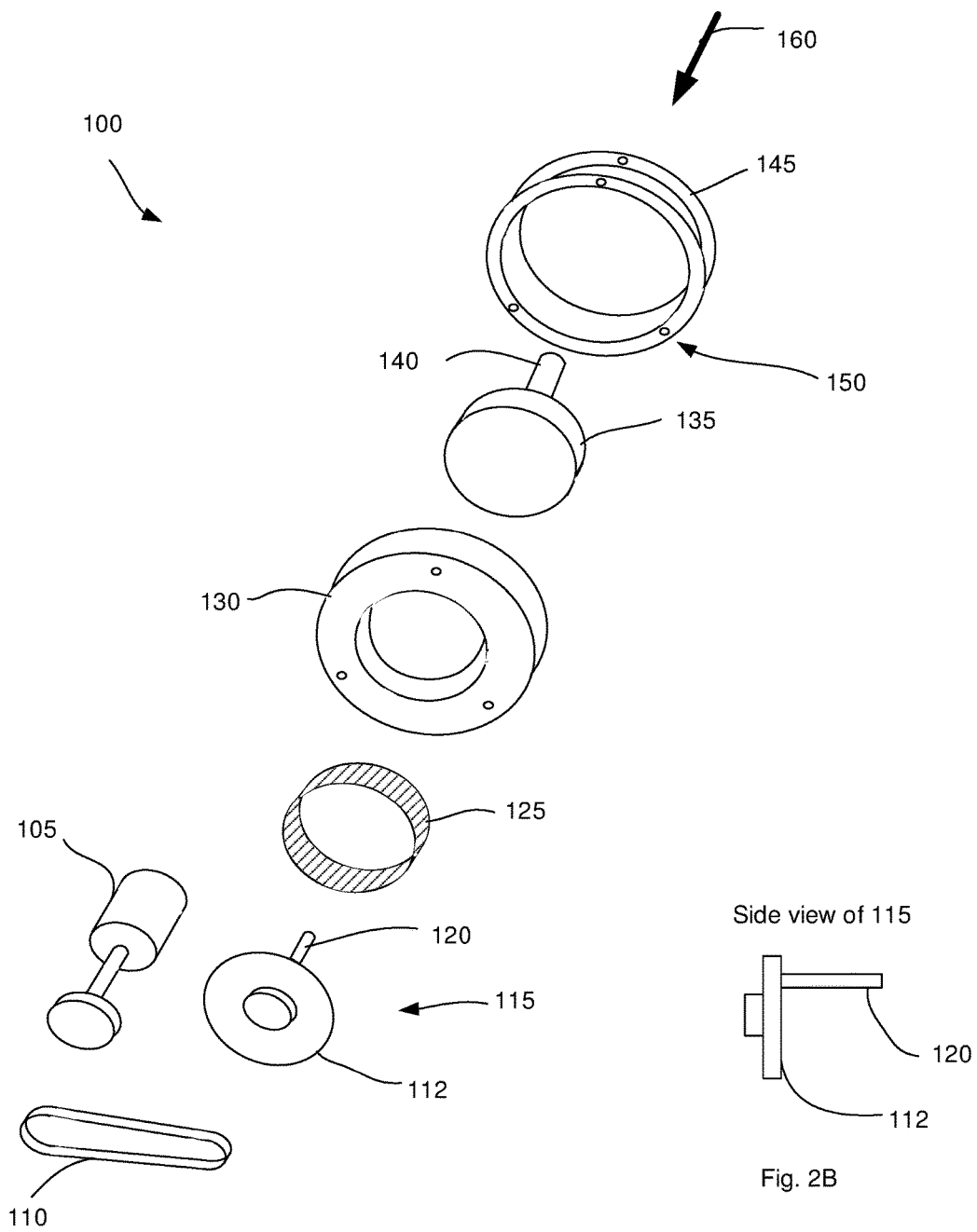
FIG. 2A is an exploded schematic diagram illustrating an example of a gearbox utilizing a belt wave drive and an electrolaminate clutch in accordance with certain aspects of the present invention.
FIG. 2B is a side view of the input rotor shown in FIG. 2A.

FIGS. 2A-G illustrate one example of a belt wave drive that may be utilized in a gearbox. FIG. 2A shows the exploded view of such a device. Motor 105 is the input to the device 100. Motor 105 is coupled through a belt drivel 10 to the input rotor 115. This input rotor 115 has a roller 120 which is coupled to the edge of the support plate 112. The roller may rotate on its own axis.

A side view of the input rotor 115 is shown in FIG. 2B. The output of the device 100 is formed by the output rotor 135 which is coupled to an output shaft 140. A belt 125 may be placed concentrically over the side surface of the output rotor 135. In this example, the side surface of the output rotor 135 and the belt 125 may form an electrolaminate clutch such that when voltage is applied across the belt and the output rotor, the belt 125 may be coupled electrostatically to the rotor. The belt 125 may be electrically conductive, or it may contain a flexible electrode encapsulated within a dielectric material, forming half of the electrolaminate pair. The output rotor 135 provides the second half of the electrolaminate pair. It may be made of a conductive material and paired with a belt coated in a dielectric material, or the output rotor 135 itself may be coated in a dielectric material and paired with a bare conductive belt.

The belt 125 may be supported by support structures 130 and 145. In this example, the support structure 145 rigidly clamps the flexible support member 130 to mechanical ground, such as a relatively stationary object. This can be done by creating holes in the support member 130 and corresponding threaded holes 150 in the rigid structure 145 and screwing a clamping ring onto support structure 145 to capture the flexible support member 130. Support structure 130 may be made of a flexible and elastic material such as but not limited to polymers. The belt 125 may be coupled to the flexible support member 130 in a number of ways including, but not limited to bonding or sewing the belt to the flexible support member.

In some examples, the entire support structure 130 along with the belt 125 may be made of one single sheet of polymer with embedded structures or features to enable electrolaminate coupling between the belt and the output rotor. One of ordinary skill in the art will readily grasp that there are a number of ways and electrical circuits that may be utilized to apply the voltage between the belt and the output rotor to obtain electrolaminate coupling. In one example, since the belt 125 is supported by support structure 145 and this structure is stationary, one end of an electrical circuit may be coupled to 145, thus enabling voltage to be applied to the belt 125. The other end of the electrical circuit may be coupled via a slip ring or a brush to the output shaft 140, which may be in electrical contact with the output rotor 135. If the output shaft 140 has a limited amount of rotation (e.g., 270 degrees or 180 degrees) relative to the stationary structure, as is often the case in robotic joints, the output rotor may be wired to the electrical circuit using a service loop. Thus, with any of these methods, a voltage may be provided across the belt 125 and the output rotor 135 to electrically control the coupling of belt 125 to output rotor 135. In some examples, roller 120 may also be configured to be electrically coupled to belt 125 through an electrolaminate effect.

Figure 2C:
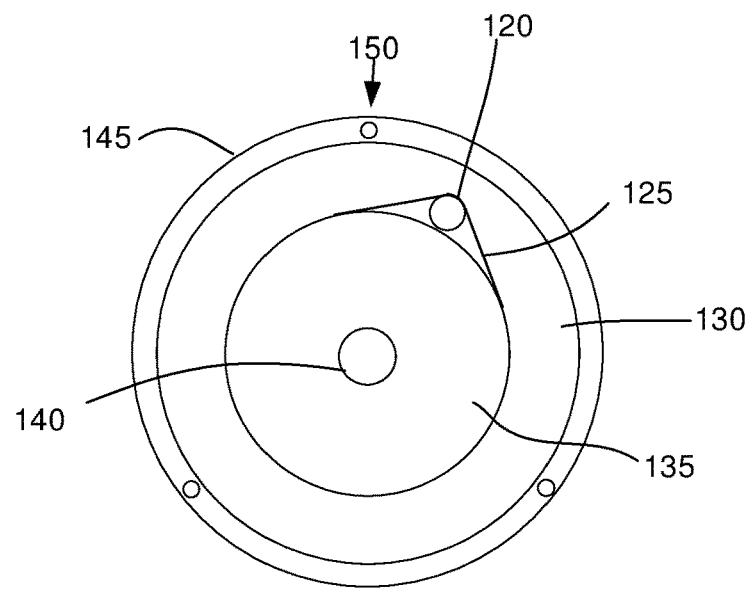
FIG. 2C is a back view of the gearbox shown in FIG. 2A.

FIG. 2C is the view of the assembled device as seen from the back of the device in the direction of the arrow 160 (shown in FIG. 2A). The roller 120 of the input rotor 112 is placed between the belt 125 and the output rotor 135. The roller 120 is thus able to lift the belt 125 if the belt 125 is electrostatically clamped to the side surface of the output rotor 135.

Figure 2D:
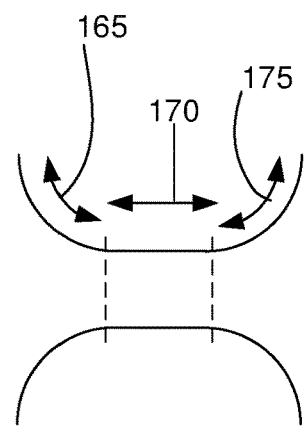
FIG. 2D is a cross-sectional schematic diagram of one example of the belt and belt support members shown in FIG. 2A.
Figure 2E:
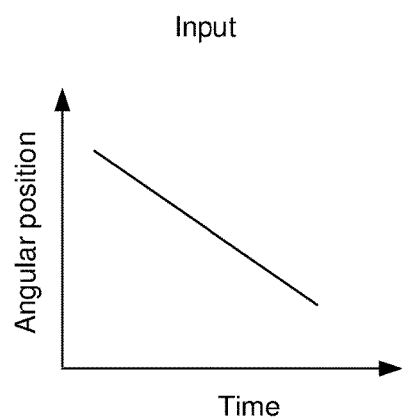
FIG. 2E is a graph illustrating an input angular position versus time for device 100 shown in FIG. 2A.

Referring back to FIG. 2A, in some examples, the belt support member 130 is tightly coupled to mechanical ground with no backlash so as to generate an output motion at a constant velocity, and yet allowing the belt 125 to simultaneously rotate a small amount. This concept will become clear after the operation of the device is described below. To continue with the discussion of how the belt 125 and the belt support member 130 may be configured, FIG. 2D illustrates an example of one such method. In FIG. 2D, a multi-segment member is illustrated—the various segments are shown by arrows 165, 170 and 175. Segment 170 forms the belt. Segments 165 and 175 hold the belt in place and may be attached to another support structure such as support structure 145 in FIG. 2A. The three segments may be made of one piece or multiple pieces. In various examples, each segment may be made of a different material. For example, 165 and 175 may be made of one material and 170 may be made of another material. In addition, the belt support structure 130 may not require symmetric support of the belt as illustrated in FIG. 2D. For example, a support structure could consist of only segments 170 and 175, without including 165.

Figure 2F:
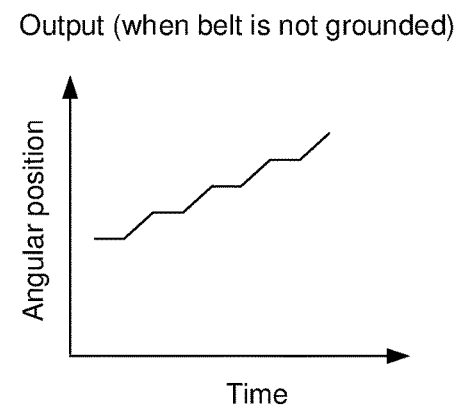
FIG. 2F is a graph illustrating an angular position of the output rotor 135 shown in FIG. 2A when the belt is not grounded.
Figure 2G:
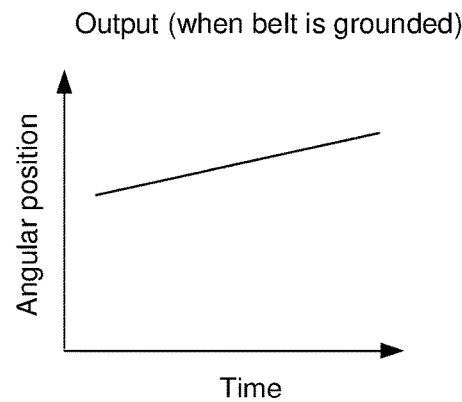
FIG. 2G is a graph illustrating an angular position of the output rotor 135 shown in FIG. 2A when the belt is grounded.

The operation of device 100 will now be described. The motor 105 drives the input rotor 112, which causes the roller 120 to trace a circular path about a central axis of the device 100. One example of the input angular position vs. time for device 100 is illustrated the graph of FIG. 2E. Assuming that there is no slipping of the belt 125 relative to the output rotor 135, as the input roller 120 rotates around the output rotor 135, it lifts a section of the belt off the output rotor and places it on a slightly different position as the roller rolls away from that section. This slightly different position of the belt accounts for the motion of output rotor as explained in Eqn. 1 above. If the belt 125 is not mechanically grounded, for example if the support structure 130 is not tightly clamped to the rigid support structure 145 (which is assumed, in this example, to be mechanically grounded), then the motion of the input will cause the output rotor to move at a non-constant velocity as illustrated in FIG. 2F. However, if the belt and the support structure are mechanically grounded, then the motion of the output with respect to time may appear as illustrated in FIG. 2G. The slopes of the graph in FIG. 2F may be different than the slope of the graph in FIG. 2G according to the gear ratio. The slopes of the graphs in FIG. 2F and FIG. 2G are opposite that of the slope in FIG. 2E due to the direction reversal of the output. The total motion of the belt 125 may be dictated by the gear ratio which is determined by the relative circumferences of the belt 125 and output rotor 135.

Returning back to the discussion regarding the belt support structure 130 and the belt 125, it was described above that they may have the ability to rotate a small amount while also being coupled to ground. For example, in a 1:120 reduction system, the belt and the output rotor may move 360°/120=3° relative to ground during a single rotation of the input rotor. To allow for this type of rotation, the belt support structure 130 generally performs two functions. It allows the belt 125 to be lifted off the output rotor 135 by the roller 120 in a radial direction. It also allows the belt 125 to rotate slightly (e.g. 3 degrees as described above) in order to keep the belt 125 from slipping on the output rotor 135, which is rotating at a constant output speed, while keeping the belt 125 fixed to ground (or fixed to a rigid circle concentric with the axis of the output rotor, in the case that the belt support structure 130 is being utilized as either the input or output).

One way to accomplish both of these functions is to use an elastic support structure as described above. If the elastic structure is thin, very little energy may be consumed in lifting and returning the belt to the surface of the roller. In some examples, the elastic modulus of the structure can be tuned by material and geometry selection to fit the necessary characteristics of the application. For some applications, it may be desirable to have a torsionally stiff belt support structure so that the output of the transmission has a high torsional stiffness.

An advantage of the example shown in FIG. 2A is that the efficiency may be high compared to other transmissions with a similar reduction ratio. The belt 125 may be made out of a very thin sheet, for example less than 1 mm, so that bending over the small radius of the roller 120 may be achieved efficiently. Also, the belt tension may not need to be high due to the utilization of the electrostatic effect to clamp the belt 125 to the surface of rotor 135 instead of relying on belt normal force and friction. Although the electrostatic effect resists shear forces, the peel motion required for the input roller 120 to spin typically requires little energy.

In the examples described above related to device 100 of FIG. 2A-G, the belt support member 130 was mechanically grounded. However, in other concepts, other members of the device 100 may be coupled to mechanical ground. In one alternative example, component 135, which functioned as an output rotor in the device 100, may be mechanically grounded and the belt support structure 150 may be utilized as the output. In this configuration, the input and output would rotate in the same direction, with a gear ratio given by equation (1) above.

More generally, returning back to FIG. 1, the belt wave drive 5 may have three components which may be input, output, or ground in different configurations of the drive. The three components are the belt 30 with support structure, the larger diameter drum 10, and the orbiting roller 20. If the orbiting roller 20 is the input, then the drive is a speed reducer as described above in Eqn. 1. If the orbiting roller is the output (and the belt with support structure or the larger diameter drum are used as input), then the drive is in a speed-increasing configuration. In many applications, it is desirable to have a transmission that decreases the speed of an electric motor and increases the torque, but other configurations are possible.

Belt Wave Drive with Braid Structure

Figure 3A:
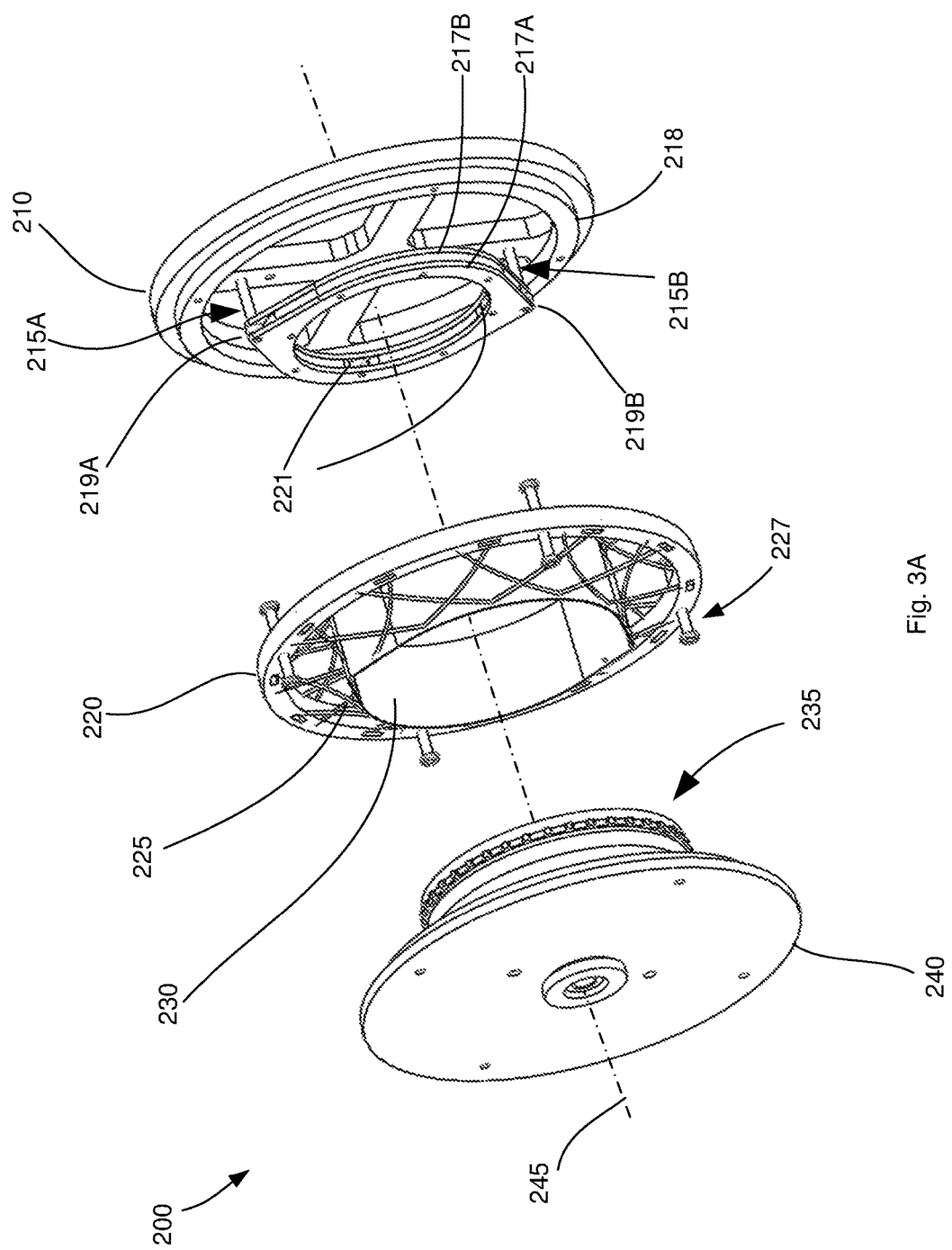
FIG. 3A is an exploded schematic diagram illustrating an example of a gearbox utilizing a belt wave drive with a braid structure in accordance with certain aspects of the present invention.

FIGS. 3A-B illustrate an embodiment of a belt wave drive with a braid structure. FIG. 3A illustrates an exploded view of the device 200 shown generally with two outer circular plates 210 and 240 and a central ring 220. When assembled, the plates and ring are placed such that their centers are along a common axis 245. In one embodiment, plate 210 may act as the input. Either one of the two plates (220 or 240) may act as a grounded component (i.e. held steady) while the other may act as an output. Plate 210 may have two subplates 217A and 217B coupled to it by two rods 215A and 215B. More or fewer number of rods 215A and 215B may couple the plate 210 and subplates 217A and 217B. The function and arrangement of the subplates will be described in more detail below.

In this example, ring 220 has a concentric belt structure 230. The belt 230 may be held within the ring 220 by various mechanisms such as, but not limited to, a braided mesh, as shown in FIG. 3A. The belt 230 may be activated electrostatically to couple with drum 235, which may itself be coupled to outer plate 240. In this example, electrostatic coupling is utilized with the side surfaces of drum 235 form a surface while the belt 230 forms the second surface of the electrolaminate device. A simplified side view of the outer plate 240 with its drum 235 is illustrated in FIG. 3B. The example in FIG. 3B also illustrates that the drum 235 may have a channel 243 whose function is explained below. In this particular example, gear teeth are illustrated on drum 235 at 242 for use in combination with electrostatic coupling. Ring 220 has rollers 227 that ride on surfaces of plate 240 and plate 210 so that the belt 230 and the drum 235 are concentrically arranged. A shaft (not shown in the Figure) constrains the plates 210 and 240 and the ring 220 such that the ring 220 is sandwiched between plates 210 and 240.

Figure 3C:
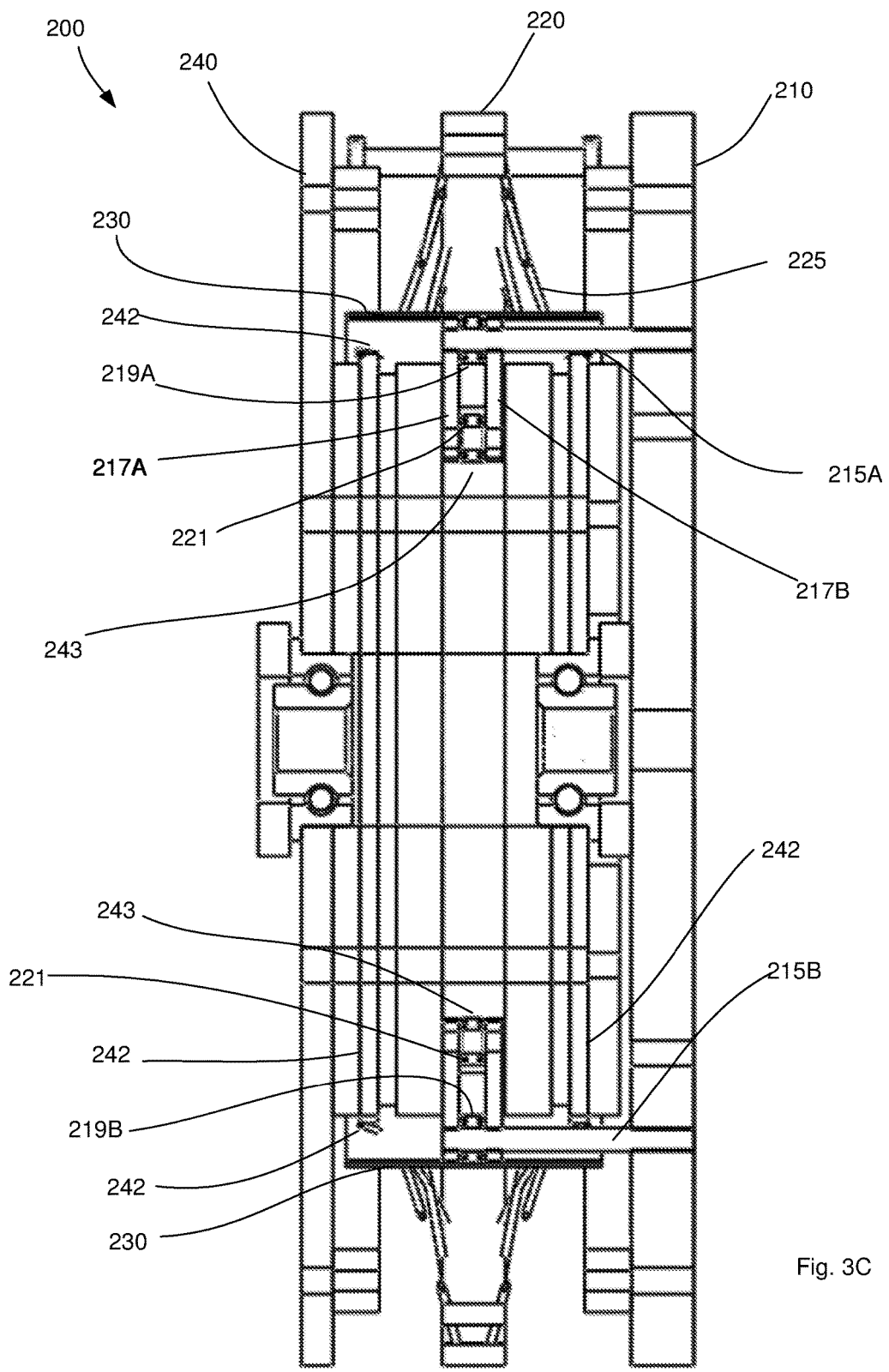
FIG. 3C is a side cross-sectional view of the assembled gearbox device shown in FIG. 3A.

In the example shown, when the plates 210, 240 and subplates 217A and 217B are assembled, the rods 215A and 215B are positioned under the belt 230 and over the drum 235 such that the rods pass over the drum without touching the drum or the belt. This is illustrated in FIG. 3C, which is the side cross-sectional view of the assembled device 200. The subplates 217A and 217B fit within a channel 243 in the drum assembly 235 and additionally have rollers 221 that ride on an inner surface of the channel and constrain it to move concentrically about the common axis 245. Additionally, at the location of the rods 215A and 215B, another set of rollers is situated radially outward from the rollers 221, which sit on the channel 243, such that the axes of the rods 215A and 215B are coincident with the rotation axes of the outer set of rollers. Hence in FIG. 3C, a pair of rollers 219A and 221 is seen at the top of the Figure with the axis of the rod 215A coincident with the axis of the roller 219A. Similarly, at the bottom of FIG. 3C, a pair of rollers 219B and 221 is seen with the axis of the rod 215B coincident with the axis of the roller 219B. With this arrangement, the rollers 219A and 219B are able to lift the belt 230 radially outward from the drum, as the input plate 210 is rotated. As the rods 215A and 215B pass over the drum and under the belt, since the belt has a slightly larger circumference than the circumference of the drum, for every rotation of the plate 210 (if it is used as an input) the belt 230 may move slightly relative to the drum in the direction of the input rotation as dictated by Eqn. 1. If the plate 240 is held fixed to mechanical ground and the plate 210 is used as an input, ring 220 will rotate according to Eqn. 1. In this situation the ring moves in the direction of rotation of the input. If the ring 220 is held (or mechanically grounded), the plate 240 will move opposite the direction of rotation of the input according to Eqn 1. In either case, the output rotation is a fraction of the input rotation as a large gear reduction ratio may be achieved.

Components of the device 200 described in FIGS. 3A-C or indeed the device 100 described in FIGS. 2A-D may be made of lightweight, inexpensive materials, such as, but not limited to, plastic, steel, polymer sheets etc. This may allow a large gear reduction ratio to be achieved with a compact, lightweight package using belt wave drives.

Figure 4B:
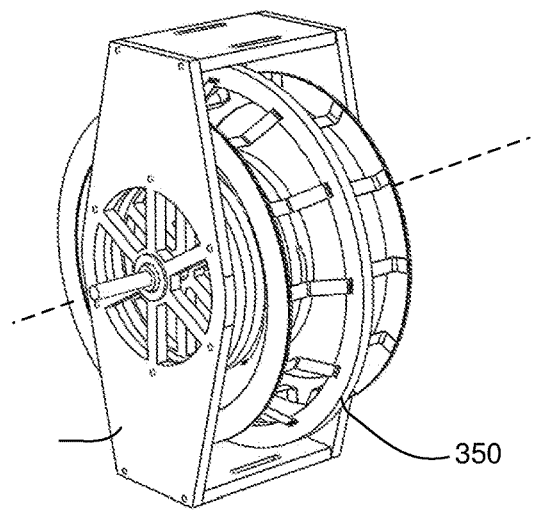
FIG. 4B is a perspective view schematic diagram showing the belt wave drive system of FIG. 4A when assembled.
Figure 4C:
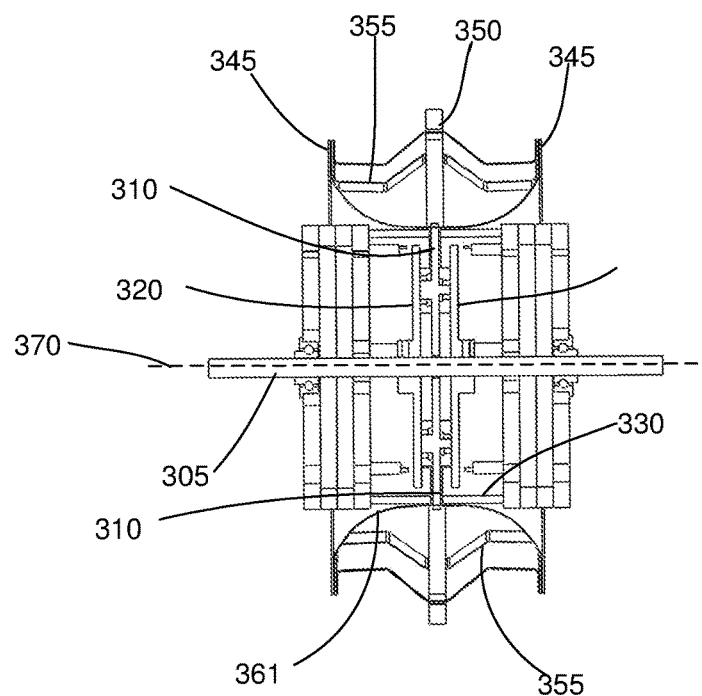
FIG. 4C is a cross-sectional view schematic diagram of the assembled belt wave drive system shown in FIG. 4B.

FIGS. 4A-D illustrate an embodiment of a belt wave drive system with a catenoid-like belt support structure. FIG. 4A is an exploded view of the device while FIG. 4B is a perspective view illustrating the device when assembled. FIG. 4C is the cross-section view. FIG. 4A illustrates two idler pulleys 310 between two idler support plates 320. The idler support plates and the idler pulleys may be positioned within the drum 330 such that the idler pulleys may be positioned through the circular slit 360 on the drum 330. The idler pulleys may thus be able to rotate about their axis of rotations in addition to being able to orbit about the axis 370 of the entire device. The position of the idler pulleys, the idler support plates, the drum and slit on the drum is illustrated in FIG. 4C.

Figure 4D:
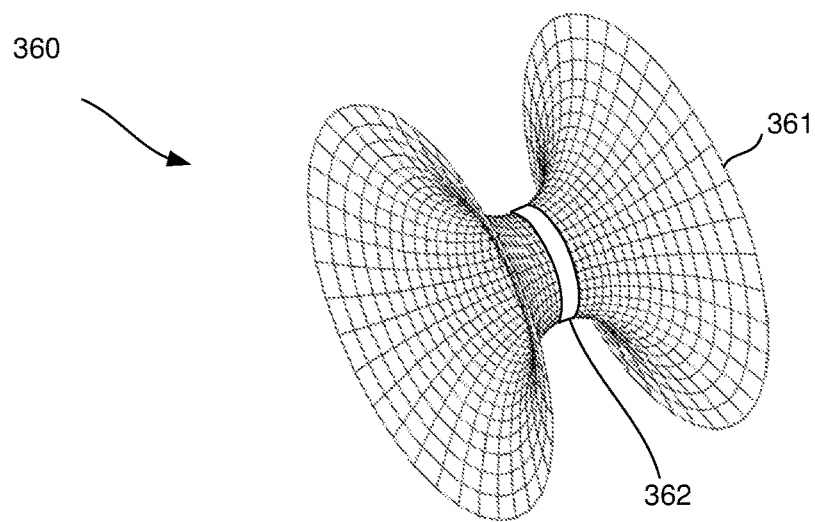
FIG. 4D is a schematic diagram illustrating an example of a mesh support structure for the belt shown in FIGS. 4A-C.

FIG. 4A shows a mesh or woven braid support structure 340 for this example. This mesh support structure may have two outer rings 345 between which a mesh may be coupled. FIG. 4D illustrates the mesh which may be coupled between the two outer rings. The mesh may have two parts, the body of the mesh 361 and a belt 362. In various embodiments, the body of the mesh may be made of various materials including, but not limited to, carbon fiber and polymers. The mesh may be made from a section of a braided tube of a large diameter, for example 2 or 3 inches. Fastening techniques, in this example, include, but are not limited to, screwing or gluing the body of the mesh to the outer rings. The mesh example in FIG. 4D has a catenoid-like shape, but other shapes may be possible.

The advantage of a catenoid is that it has a minimal surface area for a given boundary condition, the boundary condition being the location of the two outside rings 345 for the example in FIG. 4D. The body of the mesh 361 and the belt 362 are shown in FIG. 4A, and the cross-section of the mesh is shown in FIG. 4C as 360. FIG. 4D also shows a belt 362 placed at the center of mesh and supported by the mesh. When assembled, the belt 362 may be in contact with the idler pulleys 310. This example of belt 362 may be made of various materials including, but not limited to, metal or plastic. Not shown in the Figures, but, in some embodiments, the inside surface of the belt 362 and the drum 330 may contain fine teeth made of plastic or other materials so as to prevent the drum 330 and the belt 362 from slipping against each other when combined with electrostatic coupling.

Continuing with FIG. 4A, the mesh support structure 340 may have spring members as shown by 355. FIG. 4A shows several such spring members and they may be seen in cross-section in FIG. 4C. These spring members may be coupled to the outer rings 345; however they may also support a rigid output ring 350. As shown, the mesh and the outer rings are held in tension due to these spring members. The spring members may be made of various materials including, but not limited to, steel and carbon fiber. The spring members transmit torque from the outer rings 345 to the rigid output ring 350 while allowing the outer ring to flex axially (towards and away from the rigid output ring). This axial flexing occurs when the idler pulleys 310 pass underneath a section of the belt 362, lifting it off the drum 330. Slight axial flexing also occurs to compensate for the small relative rotation of the belt 362 vs. the output ring 350 during a single rotation of the input shaft.

FIG. 4B illustrates the operation of the example device 300. Shaft 305 is the input to the device and may be driven to rotate by a motor. The rotation of the input shaft 305 causes the idler pulleys 310 to orbit about the device axis 370 under the belt 362. The action of the idler pulleys 310 under the belt 362, which is supported by the mesh 340, is similar to the action of the other examples described above, such as of input rotor 20 under the belt 30 about the output drum 10 of FIG. 1 or of rods 215 under the belt 230 of FIG. 3A. When the input shaft 305 is rotated, if the housing 360 is held immovably to mechanical ground, then the rigid output ring 350 will rotate in the same direction as the input but with a large gear reduction as dictated by the equations described above. If the rigid ring 350 is held stationary by connecting it to a mechanical ground, the housing 360 will rotate with a large gear reduction in the opposite direction of the input rotation also according to the equations described above. In yet another mode of operation, if the input rotation is applied to the rigid ring 350 and the housing 360 is coupled to mechanical ground, the shaft 305 will rotate. Similarly if the input is applied to the housing 360 and the rigid ring were to be coupled to mechanical ground, the shaft 305 will rotate again. In the latter two examples, the shaft may experience a speed increase relative to the input speed. Thus, this example may be advantageous not only for the reason that it may achieve a high gear ratio reduction in certain modes of operation, but it is also backdrivable. For example, in a robotic system, a backdrivable transmission system is advantageous in assessing how much force is being applied by the robotic subsystem, such as an arm, on an object. The actuator normally driving the input, for example shaft 305 in FIG. 4B, may be used as a sensor in these circumstances in that the current needed to achieve a certain speed of the actuator may be monitored. If excessive friction forces between the actuator and the output do not exist, it may be possible to relate the current experienced by the actuator to the force the output applies on to an object. The example device 300 may provide for obtaining high gear reduction and for it to be backdrivable.

Variable Belt Wave Transmission

Figure 5A:
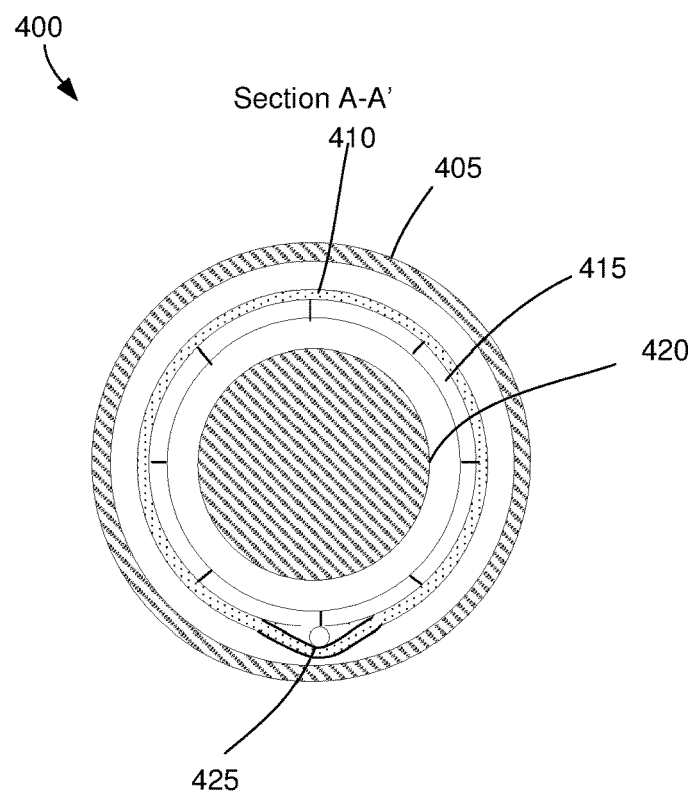
FIG. 5A is a cross-sectional schematic end view of an example of a variable belt wave drive transmission in accordance with certain aspects of the present invention.
Figure 5B:
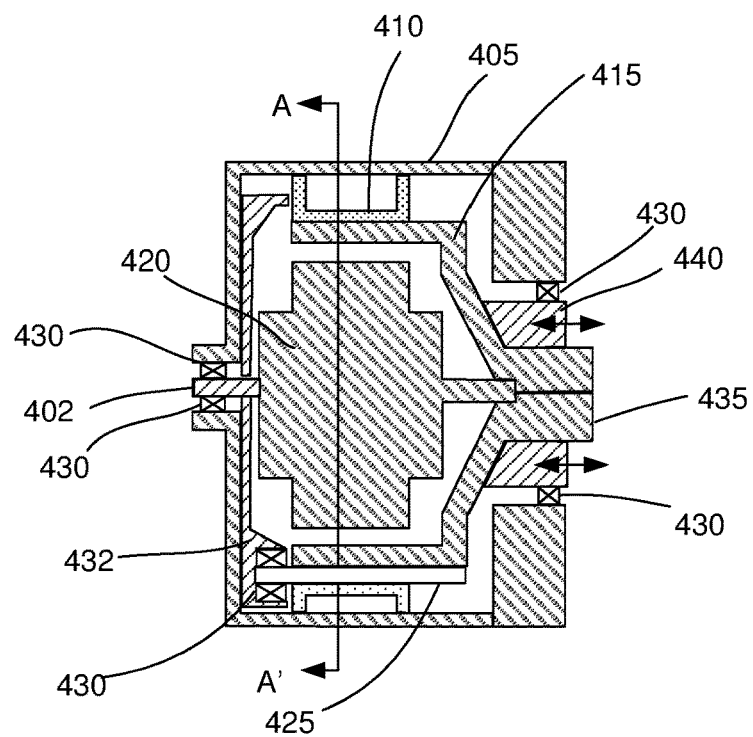
FIG. 5B is a cross-sectional side view of the variable belt wave drive transmission shown in FIG. 5A.
Figure 5C:
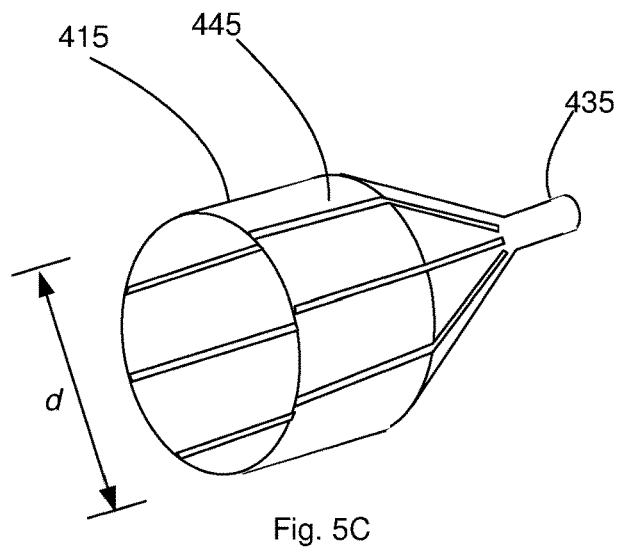
FIG. 5C is a perspective view of an example of a variable diameter drum for use in the variable belt wave drive transmission of FIG. 5A.

FIGS. 5A-C illustrate an embodiment of a variable belt wave drive transmission. In one example, the gear ratio may be caused to vary within an operating range. FIG. 5A shows a cross sectional view along plane AA' of the device 400 while FIG. 5B shows a side cross-sectional view of the device. A housing 405 may contain a motor 420 which may be a constant speed motor. The motor has an axle 402 that may spin within the housing on bearings such as 430. Several bearings are shown throughout the Figure with the same enumeration. The motor housing 405 may be rigidly coupled to the member 415, a segmented drum whose purpose will be described below.

The axle 402 may be coupled to a plate 432 with a rod 425 similar to component 115 of FIGS. 2A and 2B. The rod may be free to rotate about its own axis. This may be accomplished by having bearings on the plate such that the rod 425 may spin on its own axis, as illustrated in the example of FIG. 5B. Other ways of allowing free rotation of the rod 425 are possible including, but not limited to, putting a sleeve on the rod which is free to rotate on the rod. The rod 425 may act as the input rotor and will be denoted as such for the rest of this discussion. Thus the input rotor 425 is seen lengthwise in FIG. 5B and in cross section in FIG. 5A.

The input rotor 425 may be placed between a segmented drum 415 and a belt 410. In FIGS. 5A and 5B, the input rotor 425 is illustrated at the bottom of the Figures. The segmented drum 415 may be formed in such a way that a section of the drum may form the output rotor 435. The segmented drum 415 and the output rotor are shown in perspective view in FIG. 5C. The segments of the drum may be defined by forming long narrow slits such as 445 which may run the entire length of the length of the drum as illustrated in FIG. 5C. Multiple slits may be present forming multiple segments. The function of the slits and the segments is to change the diameter d of the drum 415. The concept of changing the diameter is explained in greater detail below. The belt 410, in this example, is placed in such a manner that it may be electrically controllably coupled to the segmented drum 415 except at the location of the input rotor 425. At that location the input rotor 425 may be between the segmented drum 415 and the belt 410. The belt 410 may generally have a cross-sectional shape as illustrated clearly in FIG. 5B but it is mechanically grounded on one side to the housing 405. The diameter of drum 415 may be varied by a diameter adaptor 440, which may be actuated to move axially, in this example, as shown by the bidirectional arrows alongside that part. In some embodiments, the diameter adjuster 440 may be adjusted manually. In some other concepts, electronic actuators may be utilized to control diameter adjuster 440 to vary the diameter of drum 415.

The example of changing the drum diameter to effect a change in the gear ratio is now described based on the following assumptions:

$$R_1 = \left(\frac{input}{output}\right)_1 \text{ and} \tag{2}$$

$$R_2 = \left(\frac{input}{output}\right)_2 \tag{3}$$

where input and output are defined as in Eqn. 1 above. The references to 1 and 2 in Eqns. 2 and 3 denote the two states before and after the drum diameter is modified. Substituting Eqn. 1 in Eqns. 2 and 3, and assuming B is the belt length and D1 and D2 are the circumferences of the output drum 415 before and after the diameter or circumference is modified, $$\frac{R_1}{R_2} = \frac{\frac{B}{D_2} - 1}{\frac{B}{D_1} - 1} \tag{4}$$

By assuming specific numbers for B and D1 and D2, it may be illustrated that a small change in drum diameter may have a large effect on the ratios. Assuming, for example, that the initial drum diameter D1=7.6 cm, B (belt length)=24 cm, the diameter is changed by 1.1 mm to obtain D2, and noting that the belt length B does not change between the two states, it can be shown that R1≈4 R2. If, for example, R1=100:1, then R2≈25:1. It can now be seen that a relatively small change in the diameter may have a large effect on the resulting ratios. The gear ratio may be varied within the operating range by active adjustment of the position of the diameter adaptor 440. Since the gear ratio is dependent on the drum diameter, the operating range may also depend on the drum diameter and the range it may be varied. Thus several factors such as, but not limited to, the material properties, the design of the drum, and the thickness all may be chosen appropriately for a given application.

In order to maintain a given amount of tension on the belt 410, the radial position of the input roller 425 may need to be adjusted to compensate for the change in diameter of the output drum 415. For some example applications, this may be achieved by spring-loading the input roller 425 away from the central axis of the device 400. In other examples, it may be possible to adjust the position of the roller 425 with a mechanism such as a rack and pinion arrangement, ball screw or lead screw, or multiple other well-known ways of effecting a small linear displacement in the location of the roller from the central axis.

In the example of FIGS. 5A-C above, the diameter of the drum 415 was adjusted using a diameter adaptor 440 and a segmented drum structure. Other methods of changing the drum diameter may be possible. In one such alternative example, the drum may be slightly conical in shape, rather than purely cylindrical, and its position relative to the belt and support structure may be adjusted. This would result in a change in the diameter of the section of the drum in contact with the belt and the rotor thus affecting the gear ratio. The drum may not need to be segmented in this alternative example. In another example, the roller may be slightly conical with a slope that is related to the slope of the drum in such a way that at multiple cross-sectional planes taken perpendicular to the axis of the device, the path of the belt around the drum and roller has the same given length.

Additionally, in other examples, the gear ratio may be varied by adjusting the circumference of the belt. Various methods may be utilized to change the belt circumference. In one such alternative example, the belt may be made out of multiple layers of electrolaminate sheets, which may be controllably adhered to each other or released. The belt may also have a return spring, such as an elastic band, keeping it coupled about the drum and input rotor even when the electrolaminate sheets are disengaged from each other.

In still other examples, the rotor 425 may be configured to allow the distance between the rotor axis and the central axis of the device 400 to be varied. Under normal conditions, the belt would be energized, bonding the layers and preserving a constant length and constant gear ratio. To change the gear ratio, the electrolaminate sheets may be turned off, disengaging them from each other and the output drum surface. The rotor 425 may be moved to a new position (closer to or farther from the central axis) using some of the mechanisms described above. Moving the rotor would cause the belt to lengthen, since the belt traces a path around the drum and rotor. The belt may then be turned on, engaging the electrolaminate layers to each other (to preserve the length of the belt) and to the drum surface (to transmit torque to the output).

Electrically Controllable Engagement Mechanisms

The attachment of the belt 30 to the drum 10 determines the maximum output torque that can be transmitted by the belt wave drive. Various means may be utilized to increase the effective coupling between the belt 30 and the drum 10. As one of ordinary skill in the art will appreciate, a variety of electrically controllable coupling techniques may be adapted for use in different examples of belt wave drives. For example, electro-laminate effect, electroadhesion, electrostatic gripping and related terms generally refer to the mechanical coupling of two objects using electrostatic forces. Electroadhesion, as described herein, uses electrical control of electrostatic forces to permit temporary and detachable attachment between two objects. This electroadhesion holds two surfaces of these objects together or increases the traction or friction between two surfaces due to electrostatic forces created by an applied electric field. The characteristics of electroadhesion generally include low slippage, high shear force and low peel-off force when de-activated.

Figure 7:
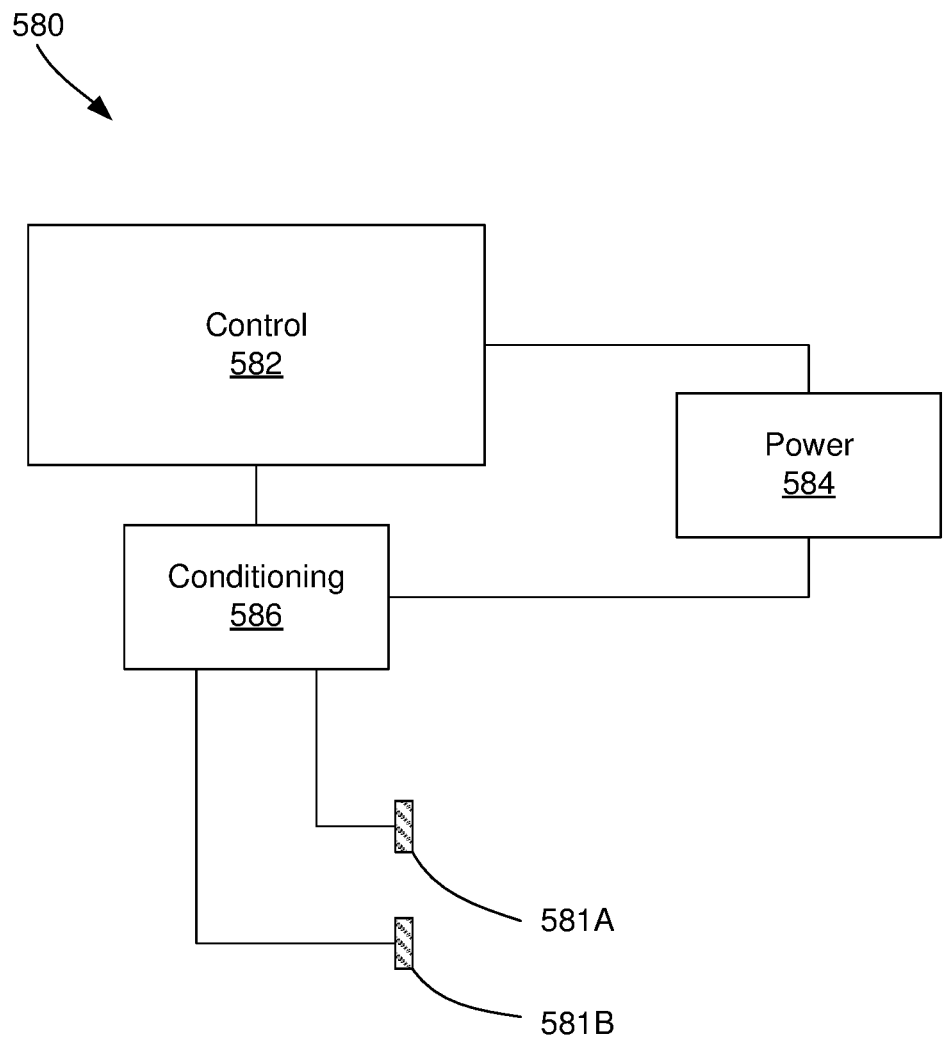
FIG. 7 is a functional block diagram illustrating one example of a control circuit configured to generate electrostatic voltage signals to produce electrostatic coupling.

In one example of an engagement technique between the belt and the rotors, in the belt wave drive examples described above, the electro-laminate effect depends on the electrostatic forces between surfaces, between the belt and the rotors in this case, to achieve clamping between the belt and an outside circumferential surface of at least one rotor. For example, the inside surface of the belt 30 of FIG. 1 and the outside surface of the drum 10 (specifically the side surfaces of the drum) may form the two electrolaminate surfaces. This arrangement provides for the belt 30 to be controllably and reversibly coupled to the drum 10. In one approach, electroadhesion or electrically controlled reversible adhesion may be obtained by applying a voltage difference, such as a high level DC voltage, between a rotor and a belt, such as rotor 10 and belt 30 of FIG. 1, to produce electrostatic attractive forces that increase traction between the rotor and belt. For example, voltage control circuit 580 of FIG. 7 is electrically couples to the rotor and the belt and applies a high voltage potential to induce in them the electro-laminate effect and clamp them together.

Figure 6A:
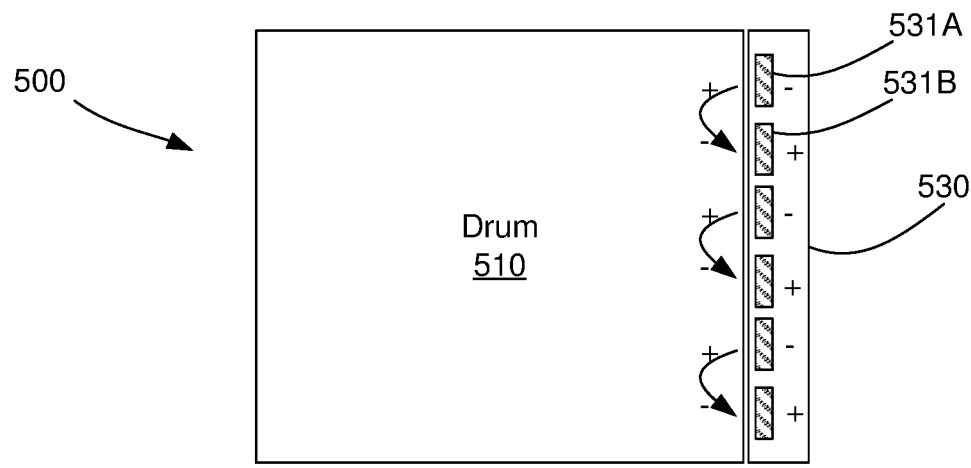
FIG. 6A is a cross-sectional side view of an example of a belt configured for electroadhesive coupling to a rotor drum.
Figure 6B:
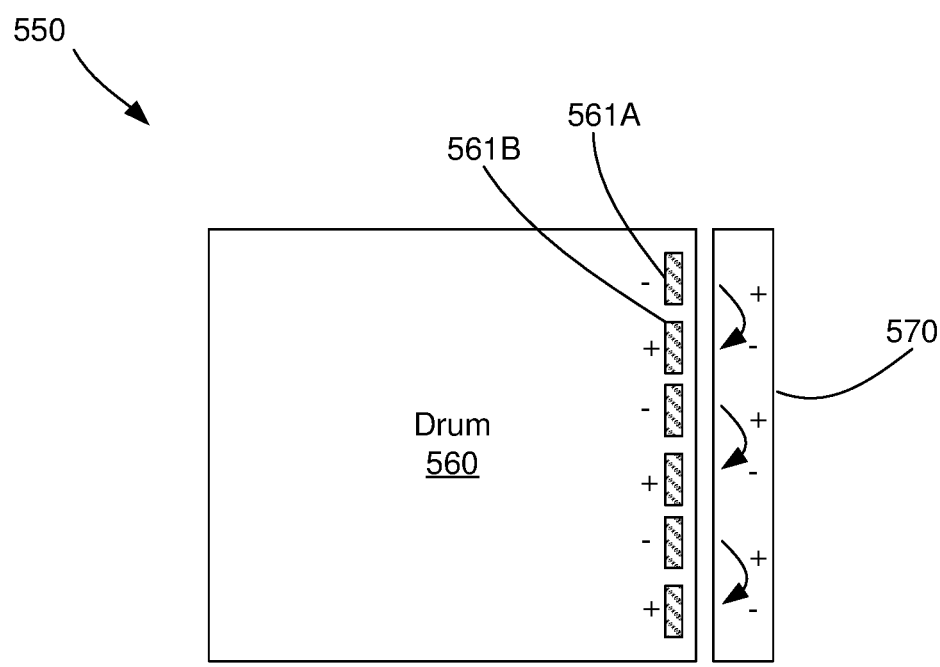
FIG. 6B is a cross-sectional side view of an example of a rotor drum configured for electroadhesive coupling to a belt.

Another electrically controllable engagement approach that may be utilized in some examples of belt wave drives involves another form of electroadhesion. FIGS. 6A and 6B illustrate examples of this form of electroadhesion, where electrodes are provided in one of the belt or the rotor and an electroadhesion voltage is applied to those electrodes to increase traction between the belt and rotor.

In the example of FIG. 6A, belt 530 is provided with at least one pair of adjacent electrodes 531A and 531B, which are electrically isolated from one another, where, for example, each electrode is a loop of conductive material embedded in belt 530. Note that multiple pairs of electrodes may be provided in belt 530, as illustrated in the example of FIG. 6A, in various embodiments. An electrostatic adhesion voltage produced by, for example, voltage control circuit 580, has alternating positive and negative charges that are applied to adjacent electrodes 531A and 531B to create an electroadhesion effect. The voltage may be applied to electrodes 531A and 531B through a variety of techniques, such as rings and brushes, which will be readily understood by one of ordinary skill in the art.

As a result of the voltage difference between electrodes 531A and 531B, an electric field forms a dielectric surface of drum 510. The electric field locally polarizes the dielectric material and thus causes electrostatic adhesion between the electrodes 531A and 531B and belt 530 and the induced charges in the dielectric material of drum 510. The induced charges may be the result of the dielectric polarization or from weakly conductive materials and leakage currents, though the examples of electrically controllable engagement techniques is not limited by the examples illustrated. For example, the induced electrostatic forces may also use the Johnson-Rahbeck effect to provide increased forces at lower power levels.

Thus, the electrostatic adhesion voltage provides an electrostatic force, between the belt 530 and the material beneath the surface of rotor or drum 510 increase the traction between them and engage the belt wave drive. Removal of the electrostatic adhesion voltage ceases the electrostatic adhesion force between belt 530 and rotor or drum 510, which reduces the traction between them and disengages the belt wave drive.

FIG. 6B illustrates another example, wherein one or more pairs of adjacent electrodes 561A and 561B are provided in drum 560. An electrostatic adhesion voltage applied to electrodes 561A and 561B forms an electric field in a dielectric surface of belt 570 that locally polarizes the dielectric material of belt 570 and causes electrostatic adhesion between the electrodes 561A and 561B and drum 560 and the induced charges in the dielectric material of belt 570. Thus, traction between drum 560 and belt 570 may be electrically controlled by the selective application of the electrostatic adhesion voltage to electrodes 561A and 561B.

FIG. 7 illustrates one simplified example of a voltage control circuit 580, wherein a control circuit 582, which may be a microprocessor or microcontroller, for example, controls conditioning circuit 586, which may condition the electrostatic adhesion voltage signal applied to the belt and drum via electrodes 581A and 581B. A power source 584, such as a battery or power supply, for example, provides operating power for the voltage control circuit 580 and provides the power for the electrostatic adhesion voltage signal applied to the electrodes. Control circuit 582 may engage the belt wave drive by causing conditioning circuit 586 to output the electrostatic adhesion voltage to the belt and drum and disengage the belt wave drive by causing conditioning circuit 586 to stop generating the electrostatic adhesion voltage. This arrangement provides for the belts and rotors of the examples described above, such as belt 30 and rotors 10 and 20, to be controllably and reversibly coupled under control of voltage control circuit 580.

In some embodiments, electroadhesion as described herein permits fast engagement and disengagement times and may be considered almost instantaneous. The speed of engagement and disengagement may be increased by several means. If the electrodes are configured with a narrower line width and closer spacing, then speed is increased using conductive or weakly conductive substrates, e.g the belt or rotor that does not include electrodes, because the time needed for charge to flow to establish the electroadhesive forces is reduced. Basically, the RC time constant of the distributed resistance-capacitance circuit including both electroadhesive device, e.g. the belt or rotor that includes electrodes, and substrate is reduced. It is also possible to use higher voltage to establish a given level of electroadhesive forces more quickly, and one can also increase speed by overdriving the voltage temporarily to establish charge distributions and adaptations quickly. To increase disengagement speeds, a driving voltage that effectively reverses polarities of electrodes at a constant rate may be employed. Such a voltage prevents charge from building up in the dielectric substrate material and thus allows faster disengagement. Alternatively, a moderately conductive material can be used between the electrodes to provide faster discharge times at the expense of some additional driving power required.

As the term is used herein, an electrostatic adhesion voltage refers to a voltage that produces a suitable electrostatic force to couple an electroadhesive device, e.g. a belt or rotor drum with electrodes, to substrate, e.g. a belt or rotor drum with a dielectric surface material. The minimum voltage needed for the electroadhesive device will vary with a number of factors, such as: the size of the electroadhesive device, the material conductivity and spacing of the electrodes, the insulating material between electrodes, the dielectric surface material, the presence of any disturbances to electroadhesion such as dust, other particulates or moisture, the weight of any structures mechanically coupled to the electroadhesive device, compliance of the electroadhesive device, the dielectric and resistivity properties of the substrate, and the relevant gaps between electrodes and substrate. In one embodiment, the electrostatic adhesion voltage includes a differential voltage between the electrodes that is between about 500 volts and about 10 kilovolts. In a specific embodiment, the differential voltage is between about 2 kilovolts and about 5 kilovolts. Voltage for one electrode can be zero. Alternating positive and negative charges may also be applied to adjacent electrodes.

Returning to the example of FIG. 7, control circuitry 580 is configured to determine when a suitable electrostatic adhesion voltage is applied to electrodes 581A and 581B. Circuitry 580 may include a processor or controller 582 that provides on/off signals that determine when electrostatic adhesion voltages are applied and some of the characteristics of the voltage signal, such as magnitude. Circuitry 580 may also determine the times associated with a charge and discharge cycle on the electroadhesive device.

Conditioning circuitry 586 may include any circuitry configured to perform one or more of the following tasks: voltage step-up, which is used when applying a voltage to the electrodes 581A and 581B, conversion between AC and DC power, voltage smoothing, and recovery of stored electrostatic energy. Conditioning circuitry 586 may be designed to receive power from a low-voltage battery if such a battery is used as power source 584. For example, in robotics applications, conditioning circuitry 586 may receive a voltage from a conventional battery, such as those less than 40 volts, and increase the voltage to an electrostatic adhesion voltages above 1 kilovolt. The low voltage power source such as the battery may be replaced by another electrical source such as a small photovoltaic panels similar to the ones used in many handheld calculators. In one embodiment, conditioning circuitry 586 includes a transformer or switching power supply configured to provide voltage step-up to electrostatic adhesion voltages described herein. In a specific embodiment, conditioning circuitry 586 includes a model No. Q50-5 as provided by EMCO High Voltage Corporation of 70 Forest Products Road, Sutter Creek Calif. Conductive leads extend from conditioning circuitry 586 to electrodes 581A and 581B.

More complex charge control circuits may be developed, depending on the configuration of the electroadhesive device and are not limited to the example of FIG. 7. Also, some of the circuit functions may be integrated. For instance, one integrated circuit may perform the control of controller 582 and a step-up of conditioning circuitry 586.

The voltages provided to the electroadhesive devices may vary. In one embodiment, AC actuation is applied to the electrodes. In some cases, electrostatic forces on a dielectric substrate may relax over a time constant under steady DC actuation. This phenomena can also occur in an insulator if it traps charge. However, by alternating the polarity of charge on each of the electrodes at a high frequency, electroadhesive forces can be maintained or even enhanced. In a specific embodiment, the AC signal includes a frequency above 1 Hz. Other higher and lower frequencies may be used. In another embodiment, multiple sets of electrodes are used with applied AC voltages offset in time or shifted in phase. This allows one set of electrodes to maintain electroadhesive forces while the AC voltage in another set temporarily passes through 0 voltage difference. In another embodiment, a DC actuation may be provided to the electrodes. In some of the cases with DC actuation, a moderately low insulator resistance may provide a leakage path to achieve a fast release when voltage is switched off. In other cases, a fixed amount of charge of opposite polarity to the DC actuation may be pulsed into the electrodes to provide release when desired. In this case, the fixed amount of charge may come from an external capacitor or one that is a part of the conditioning circuitry 586 with a capacitance equal to that of the electroadhesive device, e.g. a belt or rotor with electrodes.

Switching and response times of an electroadhesive device will vary with the electrical equipment and signal applied to the electrodes. For example, a 5 Hz signal, with a voltage rise time of one-tenth of the time period, may provide a charge and discharge cycle of 20 milliseconds.

In general, electroadhesion requires a small amount of power to increase traction between an electroadhesive device, e.g. a belt or rotor with electrodes, and a dielectric substrate, e.g. a dielectric rotor or belt. The power requirement is small because electroadhesion may be primarily thought of as a capacitive effect. This implies that with appropriate selection of insulation material to minimize leakage currents, the reactive power remains small. Resistivity of insulating material may be reduced if trapped charge becomes a problem as long as the leakage current remains acceptable.

Further information regarding some electrostatic adhesion voltages that may be suitable for use in various examples of belt wave drives as described herein are described in commonly owned U.S. Pat. No. 7,551,419 for "Electroadhesion", as well as U.S. Pat. Nos. 7,554,787 and 7,773,363 and U.S. Published Application No. 20130010398 hereby incorporated in their entirety for all purposes.

Other examples of electrostatic techniques may be adaptable for use in the presently described belt way drive. For example, electrostatic gripping has been utilized in a variety of industries, including semiconductor manufacturing, for many years, examples of which are shown in U.S. Pat. No. 5,103,367 for "Electrostatic Chuck Using A.C. Field Excitation", U.S. Pat. No. 5,325,261 for "Electrostatic Chuck with Improved Release", and U.S. Pat. No. 6,922,324 for "Remote Powering of Electrostatic Chucks".

Other forms of electrically controllable coupling may possibly be adapted for use in the examples of belt wave drives discussed herein, such as eddy current braking described in U.S. Pat. No. 7,592,727 for "Quiet Load for Motor Testing" or the inductive coupling described in U.S. Pat. No. 5,856,710 for "Inductively Coupled Energy and Communication Apparatus". Another electrically controllable coupling approach that may be adapted in some examples includes magnetic coupling, where, for example, a rotor with electromagnets adjacent its outer surface that engages electromagnets in a belt and the electromagnets are configured to have alternating polarity to provide torque transfer between the rotor and belt. Further information regarding magnetic coupling is described at Magnetically Coupled Drive—OpenROV R&D (https://forum.openrov.com/t/magnetically-coupled-drive/30) and magnetic gearing techniques, an example of which is described in U.S. Pat. No. 5,569,967 for "Magnetic Gear and Gear Train Configuration". These references are also incorporated by reference in their entirety for all purposes.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

We claim:

1. A variable transmission system, comprising:
    a first rotor configured to rotate about its axis of rotation;
    a second rotor comprising a drum configured to rotate about its axis of rotation, wherein the first rotor is constrained to orbit concentrically about the axis of rotation of the drum; and
    a belt encircling the first rotor and the drum, wherein the belt couples the first and second rotors such that as the first rotor moves concentrically around the drum the belt advances about a circumference of the drum, wherein the drum has a variable diameter that provides a variable gear ratio.

2. The variable transmission system of claim 1, wherein the first rotor comprises a rod coupled to a plate.

3. The variable transmission system of claim 2, wherein the plate is coupled to an axle driven by a motor.

4. The variable transmission system of claim 1, wherein the drum comprises a plurality of segments, and wherein the segments are adjustable to vary the diameter of the drum.

5. The variable transmission system of claim 4, wherein the plurality of segments is defined by a plurality of slits that run along a length of the drum.

6. The variable transmission system of claim 1, further comprising a diameter adaptor, wherein the diameter adaptor is coupled to the second rotor such that axial movement of the diameter adaptor varies the diameter of the drum.

7. The variable transmission system of claim 1, wherein the drum has a conical shape that provides the variable diameter.

8. The variable transmission system of claim 1, wherein a position of the first rotor relative to the axis of rotation of the drum is adjustable.

9. The variable transmission system of claim 1, wherein the belt and the drum are configured to be electrically coupled.

10. The variable transmission system of claim 9, wherein the belt and the first rotor are configured to be electrically coupled.

11. The variable transmission system of claim 9, wherein the belt and the drum are configured to be electrically coupled through an electrolaminate effect between the belt and an outer surface of the drum.

12. A method for providing a variable gear ratio, comprising:
providing a first rotor configured to rotate about its axis of rotation;
providing a second rotor comprising a drum configured to rotate about its axis of rotation, wherein the first rotor is constrained to orbit concentrically about the axis of rotation of the drum, wherein the drum has a variable diameter that provides the variable gear ratio;
coupling the first and second rotors with a belt, wherein the belt encircles the first rotor and the drum;
adjusting a diameter of the drum; and
moving the first rotor concentrically around the drum with the adjusted diameter to advance the belt about a circumference of the drum with the adjusted diameter.

13. The method of claim 12, wherein moving the first rotor concentrically around the drum comprising driving the first rotor by a motor.

14. The method of claim 13, wherein the first rotor comprises a rod coupled to a plate, and wherein the plate is coupled to an axle driven by the motor.

15. The method of claim 12, wherein the drum comprises a plurality of segments defined by a plurality of slits that run along a length of the drum, wherein adjusting the diameter of the drum comprises adjusting the plurality of segments.

16. The method of claim 12, wherein the second rotor is coupled to a diameter adaptor, wherein adjusting the diameter of the drum comprises moving the diameter adaptor in an axial direction.

17. The method of claim 12, further comprising:
adjusting a position of the first rotor relative to the axis of rotation of the drum.

18. The method of claim 12, further comprising:
electrically coupling the belt and the drum.

19. The method of claim 18, further comprising:
electrically coupling the belt and the first rotor.

20. The method of claim 18, wherein electrically coupling the belt and the drum comprises electrically coupling the belt and the drum through an electrolaminate effect between the belt and an outer surface of the drum.

* * * * *